US008525855B1

(12) United States Patent
Freyhult et al.

(10) Patent No.: US 8,525,855 B1
(45) Date of Patent: *Sep. 3, 2013

(54) DRAG HANDLE FOR APPLYING IMAGE FILTERS IN PICTURE EDITOR

(75) Inventors: Maria Christina Nathalie Freyhult, Malmo (SE); Arun Kumar, Waterloo (CA)

(73) Assignee: Blackberry Limited (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/552,823

(22) Filed: Jul. 19, 2012

Related U.S. Application Data

(63) Continuation of application No. 13/459,490, filed on Apr. 30, 2012.

(60) Provisional application No. 61/605,417, filed on Mar. 1, 2012.

(51) Int. Cl.
*G09G 5/02* (2006.01)
*G06F 3/0481* (2013.01)

(52) U.S. Cl.
CPC .................................. *G06F 3/0481* (2013.01)
USPC .......................................... 345/661; 345/660

(58) Field of Classification Search
CPC ................... G06F 3/0481; G06F 2203/04806; G06F 2203/04805
USPC ................................................ 345/661, 660
See application file for complete search history.

(56) References Cited

U.S. PATENT DOCUMENTS

| 6,154,755 | A | 11/2000 | Dellert et al. | |
|---|---|---|---|---|
| 7,143,357 | B1* | 11/2006 | Snibbe et al. | 715/751 |
| 7,425,958 | B2* | 9/2008 | Berger et al. | 345/427 |
| 7,568,492 | B1* | 8/2009 | Helmer | 135/117 |
| 7,974,492 | B2* | 7/2011 | Nishijima | 382/276 |
| 2002/0154149 | A1 | 10/2002 | Hebber et al. | |
| 2003/0234871 | A1* | 12/2003 | Squilla et al. | 348/220.1 |
| 2004/0073583 | A1* | 4/2004 | Watanabe et al. | 707/206 |
| 2004/0117358 | A1 | 6/2004 | Von Kaenel et al. | |
| 2005/0268254 | A1 | 12/2005 | Abramson et al. | |
| 2006/0104513 | A1* | 5/2006 | Aharon et al. | 382/180 |
| 2006/0206442 | A1 | 9/2006 | Hartman | |
| 2006/0248209 | A1* | 11/2006 | Chiu et al. | 709/231 |
| 2007/0143082 | A1* | 6/2007 | Degnan | 703/1 |

(Continued)

FOREIGN PATENT DOCUMENTS

EP 2128823 A1 12/2009
WO WO2008027155 3/2008

OTHER PUBLICATIONS

"Adobe Photoshop CS5" manual dated 2011.*

(Continued)

*Primary Examiner* — Javid A Amini

(57) ABSTRACT

The present disclosure provides for dynamic application of image filters in picture editor applications. A selected filter is dynamically applied to a portion of an image displayed on a screen as a drag handle is moved across the image, the portion of the image to which the selected filter is applied being changeable in size with motion of handle across the image and determined by a position of the handle on the screen. Changes to the portion of the image caused by application of the selected filter are dynamically displayed as the handle is moved across the image displayed on the screen.

19 Claims, 8 Drawing Sheets

(56) References Cited

U.S. PATENT DOCUMENTS

| | | | |
|---|---|---|---|
| 2007/0198584 A1* | 8/2007 | Vienneau et al. | 707/104.1 |
| 2008/0027155 A1 | 1/2008 | Bayer et al. | |
| 2008/0051989 A1 | 2/2008 | Welsh | |
| 2008/0120538 A1 | 5/2008 | Kurz et al. | |
| 2009/0106113 A1 | 4/2009 | Arora et al. | |
| 2009/0119062 A1 | 5/2009 | Owens et al. | |
| 2009/0146961 A1* | 6/2009 | Cheung et al. | 345/172 |
| 2009/0303338 A1 | 12/2009 | Chaurasia et al. | |
| 2010/0094548 A1 | 4/2010 | Tadman et al. | |
| 2010/0097375 A1 | 4/2010 | Tadaishi et al. | |
| 2010/0119203 A1* | 5/2010 | Lewis | 386/52 |
| 2010/0171712 A1 | 7/2010 | Cieplinski et al. | |
| 2010/0295945 A1 | 11/2010 | Plemons et al. | |
| 2011/0163953 A1 | 7/2011 | Tabasso et al. | |
| 2011/0185297 A1 | 7/2011 | Reid et al. | |
| 2011/0292216 A1* | 12/2011 | Fergus et al. | 348/164 |
| 2011/0293150 A1 | 12/2011 | Capolunghi et al. | |
| 2012/0017161 A1 | 1/2012 | Hirshberg | |
| 2012/0065944 A1 | 3/2012 | Nielsen et al. | |
| 2012/0236117 A1 | 9/2012 | Quadling et al. | |

OTHER PUBLICATIONS

Extended European Search Report, EP Appl. 12166153.2, Feb. 19, 2013.

PCT Appl PCT/CA2013/050149, International Search Report and Written Opinion, May 22, 2013.

* cited by examiner

DRAG HANDLE FOR APPLYING IMAGE FILTERS IN PICTURE EDITOR

PRIORITY CLAIM

This application is a continuation of the application entitled "Drag Handle for Applying Image Filters in Picture Editor", application Ser. No. 13/459,490, filed Apr. 30, 2012, which in turn claims priority to Provisional Application No. 61/605,417 entitled "Drag Handle for Applying Image Filters in Picture Editor", filed Mar. 1, 2012. These prior applications, including the entire written description and drawing figures, are hereby incorporated into the present application by reference. This application is further related to application entitled "Drag Handle for Applying Image Filters in Picture Editor", Application Ser. No. 13/552,840, filed even date herewith.

BACKGROUND

When applying filters to images in picture editor applications, it is often difficult for a user to discern the changes made to an image in the application of various filters and, as such, it is often difficult for the user to select the best filter or filters to effect desired image processing. In some cases, the user can revert back to the original picture but must try to retain a recollection of the image to determine whether a particular filter is desired. In other cases, "before" and "after" images can be placed side by side for viewing, but the changes in the image for a particular filter are applied to an entire image, making it difficult for the user to gain perspective on the changes made to an image through the application of filters, other than to form a generalized impression about previously applied filters.

It would be useful to provide a more intuitive, straightforward and user friendly approach for the application of image filters in picture editor applications.

BRIEF DESCRIPTION OF THE DRAWINGS

Exemplary embodiments of the present disclosure will be described below with reference to the included drawings such that like reference numerals refer to like elements and in which.

DETAILED DESCRIPTION

Figure 1:
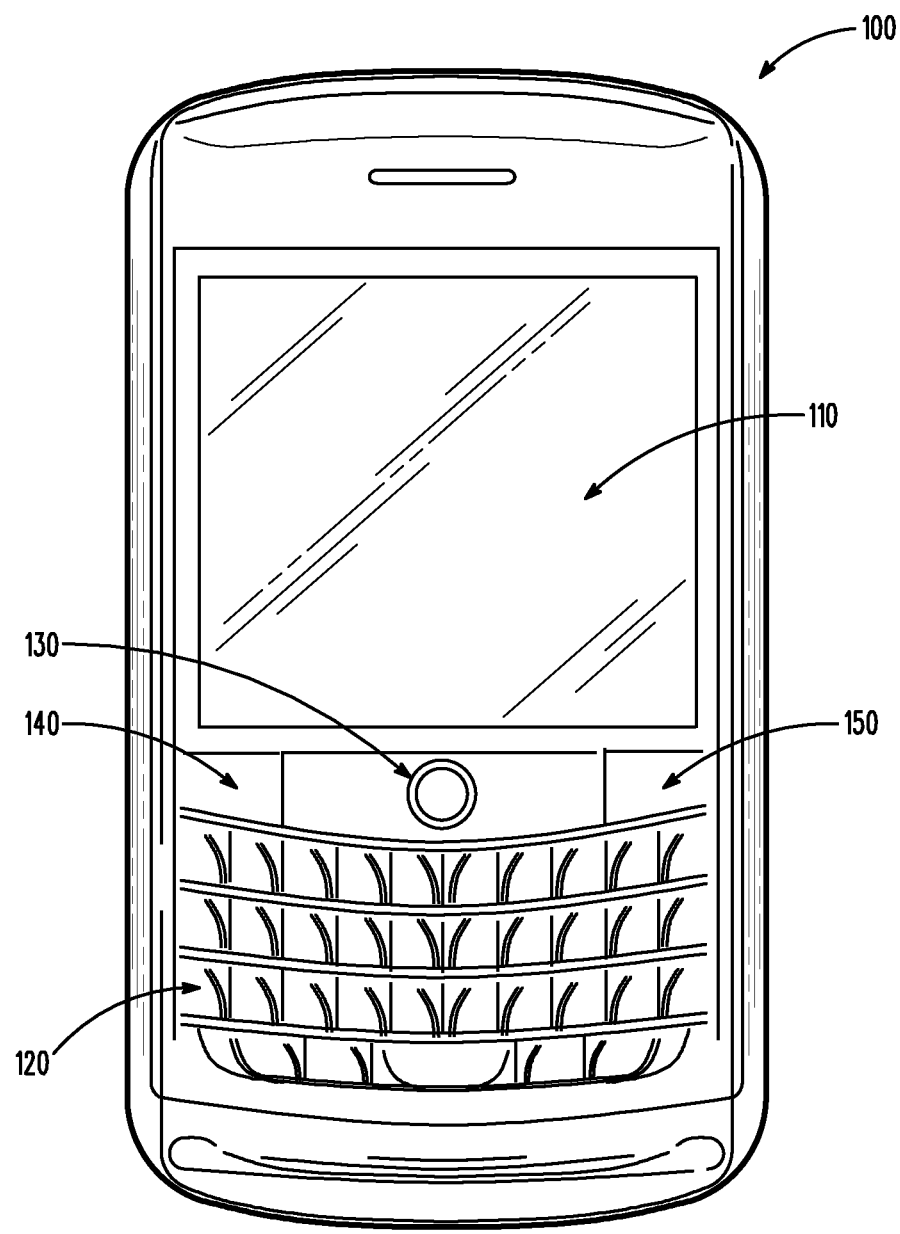
FIG. 1 is a front view of a mobile electronic device, in accordance with various aspects of the present disclosure.

The various illustrative examples presented herein outline methods, user interfaces, and electronic devices that allow a filter to be dynamically applied to an image in a manner that is easily controllable by a user of a photo editor application and that allows the user to progressively see changes to an image as the filter is being applied. The use of a drag handle by a user in a user interface of a photo editor application allows the user to focus on the image as it changes during application of the filter.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

Therefore, in accordance with certain aspects of the present disclosure, there is provided a method of dynamically applying image filters, comprising: dynamically applying a selected filter of a plurality of selectable filters to a portion of an image displayed on a screen as a drag handle is moved across the image, the portion of the image to which the selected filter is applied being changeable in size with motion of handle across the image and determined by a position of the handle on the screen; and dynamically displaying the changes to the portion of the image caused by application of the selected filter as the handle is moved across the image displayed on the screen.

In accordance with another aspect of the present disclosure, there is provided an electronic device, comprising: a screen; a processor coupled to the screen; a memory coupled to and in cooperative arrangement with the processor, the processor and the memory configured to: dynamically apply a selected filter of a plurality of selectable filters to a portion of an image displayed on a screen as a drag handle is moved across the image, the portion of the image to which the selected filter is applied being changeable in size with motion of handle across the image and determined by a position of the handle on the screen; and dynamically display the changes to the portion of the image caused by application of the selected filter as the handle is moved across the image displayed on the screen.

In accordance with still further aspects of the present disclosure, there is provided a non-transitory computer-readable medium having computer-executable instructions for performing the method of dynamically applying image filters, comprising: dynamically applying a selected filter of a plurality of selectable filters to a portion of an image displayed on a screen as a drag handle is moved across the image, the portion of the image to which the selected filter is applied being changeable in size with motion of handle across the image and determined by a position of the handle on the screen; and dynamically displaying the changes to the portion of the image caused by application of the selected filter as the handle is moved across the image displayed on the screen.

FIG. 1 is an illustration of an example electronic device 100 in accordance with aspects of the present disclosure. Electronic device 100 may be a mobile or portable device with a touch-sensitive touch screen. Examples of such electronic devices include mobile phones, cellular phones, smart phones, personal digital assistants (PDAs), digital cameras, wireless organizers, wirelessly enabled notebook computers, tablet computing devices, handheld electronic gaming devices, digital photograph albums, and the like. Electronic device 100 has a touch screen 110 for displaying information, and may also have a keyboard 120 for entering information such as composing email messages, and a pointing device 130 such as a trackball, track wheel, touchpad, and the like, for navigating through items on screen 110. Navigation keys 140 and 150 may be used for navigating content. In some examples, display 110 is a touch screen and the plurality of keys and/or keyboard are soft keys or icons displayed on display 110 and actuated by a human finger or a stylus.

Figure 2:
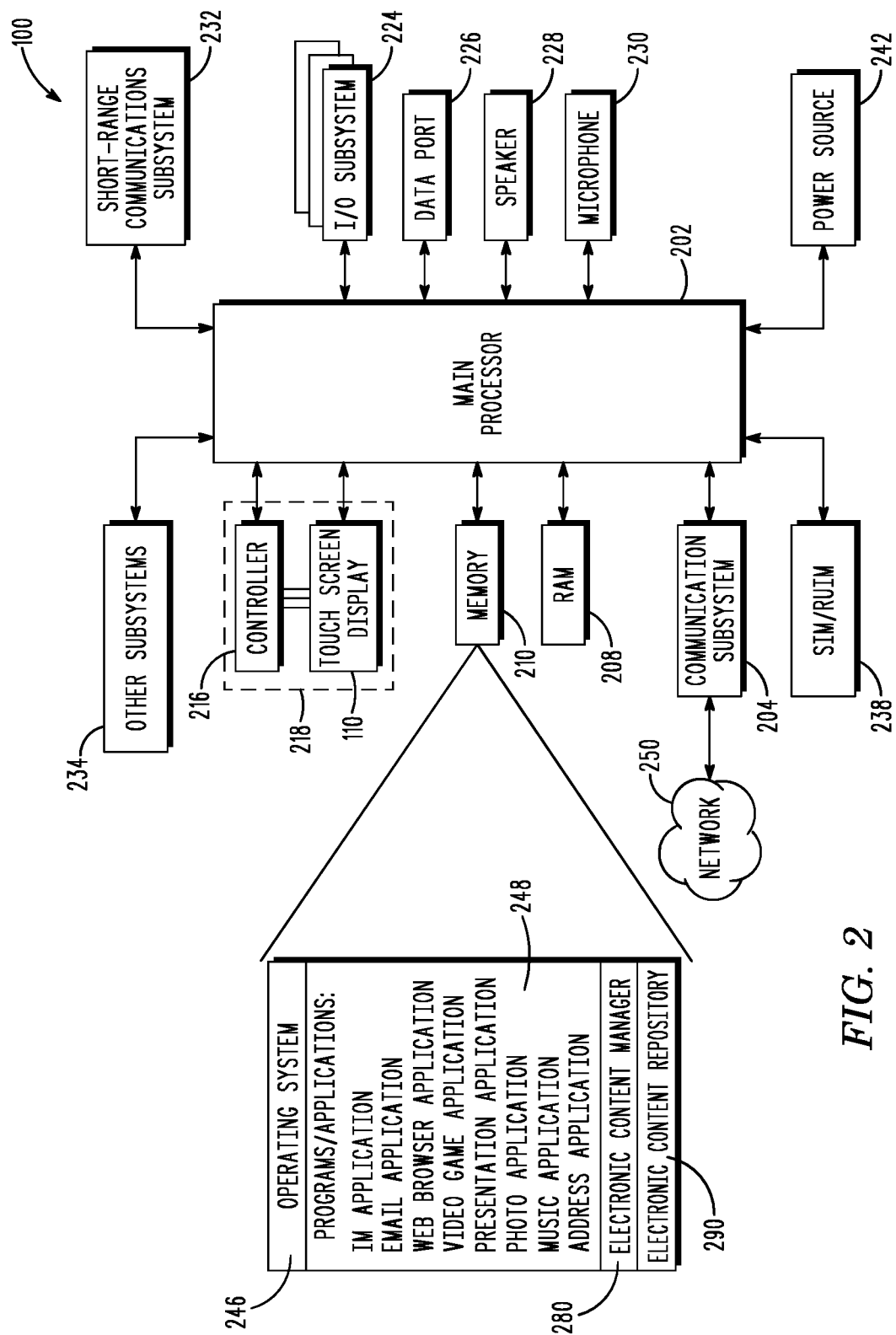
FIG. 2 is a block diagram of an example functional representation of the electronic device of FIG. 1, in accordance with certain aspects of the present disclosure.

FIG. 2 is a block diagram of an example functional representation of the electronic device 100 of FIG. 1, in accordance with certain aspects of the present disclosure. Electronic device 100 includes multiple components, such as a processor 202 that controls the overall operation of electronic device 100. Communication functions, including data and voice communications, are performed through a communication subsystem 204. Communication subsystem 204 receives data from and sends data to a network 250, such as a wide area network, in long-range communication. An example of the data sent or received by the communication subsystem includes but is not limited to email messages, short messaging service (SMS), instant messages, web content, and other electronic content. The wireless network 250 is, for example, a cellular network. In some examples, network 250 is a WIMAX network, a wireless local area network (WLAN) connected to the Internet, or any other suitable communications network. In other examples, other wireless networks are contemplated, including, but not limited to, data wireless networks, voice wireless networks, and networks that support both voice and data communications.

A power source 242, such as one or more rechargeable batteries, a port to an external power supply, a fuel cell, or a solar cell, powers electronic device 100.

The processor 202 interacts with other functional components, such as Random Access Memory (RAM) 208, memory 210, a touch screen 110 (such as, for example, a LCD) which is operatively connected to an electronic controller 216 so that together they comprise a display subsystem 218, an input/output (I/O) subsystem 224, a data port 226, a speaker 228, a microphone 230, short-range communications subsystem 232, and other subsystems 234. It will be appreciated that the electronic controller 216 of the display subsystem 218 need not be physically integrated with the touch screen 110.

The auxiliary I/O subsystems 224 could include input devices other than the touch screen if desired, such as one or more control keys, a keyboard or keypad, navigational tool (input device), or both. The navigational tool could be a clickable/depressible trackball or scroll wheel, or touchpad. User-interaction with a graphical user interface is performed through the I/O subsystem 224.

Electronic device 100 also includes one or more clocks including a system clock (not shown) and sleep clock (not shown). In other examples, a single clock operates as both system clock and sleep clock. The sleep clock is a lower power, lower frequency clock.

To identify a subscriber for network access, electronic device 100 uses a Subscriber Identity Module or a Removable User Identity Module (SIM/RUIM) card 238 for communication with a network, such as the wireless network 250. Alternatively, user identification information is programmed into memory 210.

Electronic device 100 includes an operating system 246 and software programs, subroutines or components 248 that are executed by the processor 202 and are typically stored in a persistent, updatable store such as the memory 210. In some examples, software programs or applications 248 include, for example, personal information management application; communications applications such as Instant Messaging (IM), presentation and email applications; messaging applications; video game applications; web browser applications; photo applications; address applications; music applications; and the like. As will be described further below, such applications may be represented by a representative icon or image. Additional applications or programs can be loaded onto electronic device 100 through data port 226, for example. In some examples, programs are loaded over the wireless network 250, the auxiliary I/O subsystem 224, the short-range communications subsystem 232, or any other suitable subsystem 234.

An electronic content manager 280 is included in memory 210 of device 100. Electronic content manager 280 enables device 100 to fetch, download, send, receive, and display electronic content as will be described in detail below.

An electronic content repository 290 is also included in memory 210 of device 100. The electronic content repository or database, 290 stores electronic content such as electronic books, videos, music, multimedia, photos, and the like.

Figure 3:
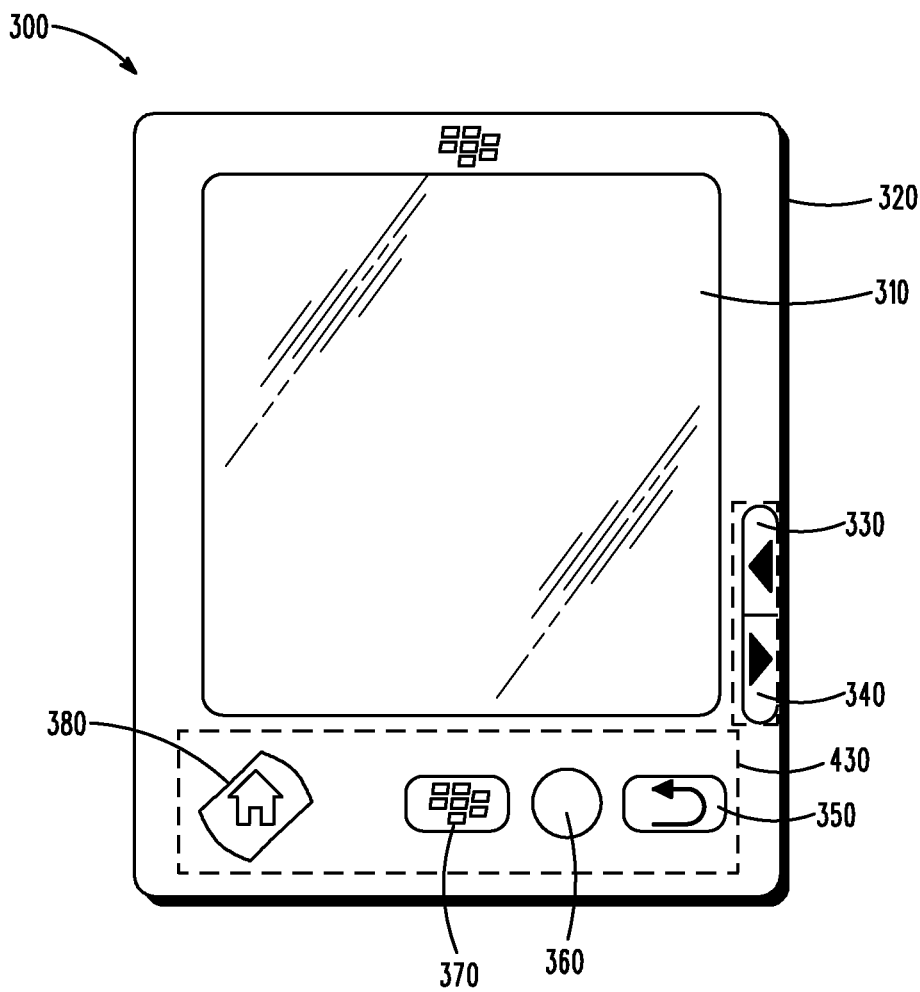
FIG. 3 is a front view of an electronic device having a larger touch screen, in accordance with aspects of the present disclosure.

Referring now to FIG. 3, an illustration of an electronic device 300 having a larger touch screen 310 is presented, in accordance with an example of the present disclosure. The electronic device 300 has a housing 320 which holds a large touch screen display 310 suitable for viewing visual electronic content such as electronic books, photos, videos, and the like. The mobile device 300 includes an input subsystem 430 (indicated within dashed lines in FIG. 3) that in addition to the touch screen display may include keys 330, 340, 350, 360, 370, and 380, located in the housing 320 of the device. For example, menu key 370 is used to cause the electronic device 300 to render on display 310 a graphical user interface (GUI), action key 360 is used to initiate an action by activating an element from the GUI, and escape key 350 is used to cancel the last action performed or return to a previous screen on the GUI. Of course, these keys may be soft keys or icons displayed on touch screen 310 and actuated by a human finger or stylus.

Navigation keys 330 and 340 are used, for example, to navigate forwards and backwards within content viewed on touch screen display 310, respectively. As an example, keys 330 and 340 are used to flip pages when viewing an electronic book, to navigate to a different scene in video content, or to select a different audio track to play. The home key 380 causes the mobile electronic device 300 to render on touch screen display 310 a default home screen (not shown). Electronic device 300 also comprises a speaker (not shown) for playing back audio content, the audio component of video content, or audio produced by text-to-speech of text content, multimedia, and the like.

In various aspects of the disclosure, touch screen 310 serves as a display and an interface between a user and the device 300. Touch screen 310 and the plurality of keys 330, 340, 350, 360, 370, and 380 may be soft keys or icons displayed on touch screen display 310 and actuated by a human finger or a stylus.

Figure 4:
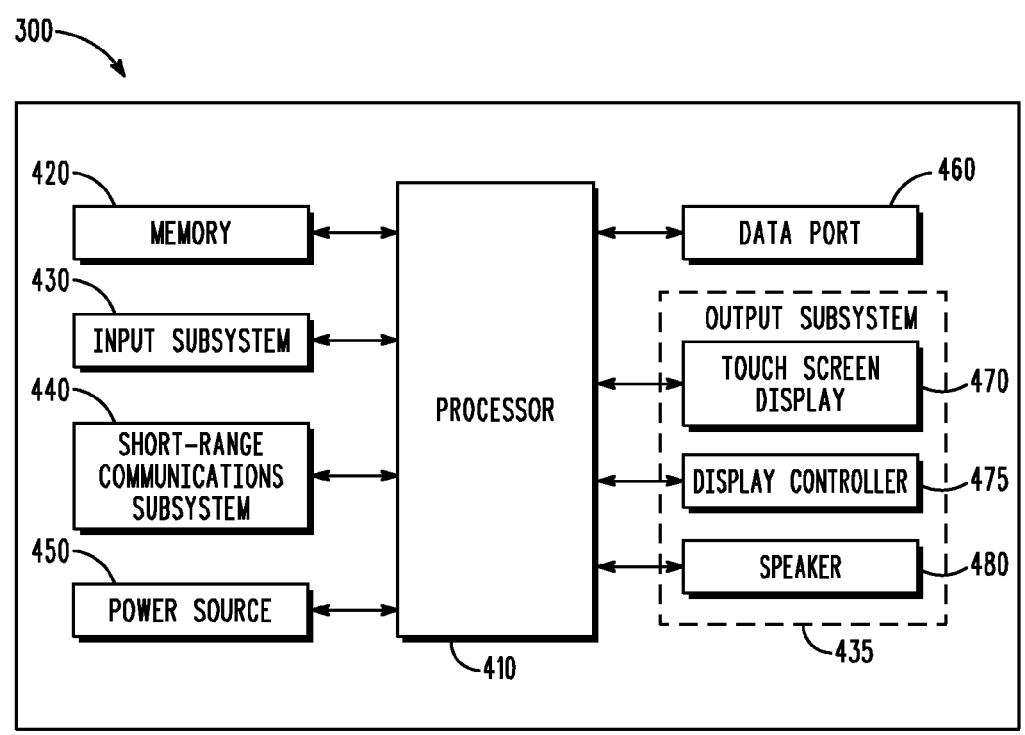
FIG. 4 is a block diagram of an example functional representation of the electronic device of FIG. 3, in accordance with certain aspects of the present disclosure.

FIG. 4 provides an example functional representation of electronic device 300. Additionally, FIG. 4 may provide an alternate example of a block diagram representation of the electronic device 300 of FIG. 3. As shown in FIG. 4, electronic device 300 has a processor 410 that controls the overall operation of the electronic device 300. Short-range communications subsystem 440, such as a BLUETOOTH® subsystem, is coupled to processor 410 provides short-range communications capability used for sending and receiving electronic content at mobile electronic device 300. A data port 460, such as a Universal Serial Bus (USB) port, is used for sending and receiving electronic content at mobile electronic device 300.

Memory 420 may be a Flash memory chip and contains an operating system and other software modules subroutines utilized by processor 410 to operate electronic device 300. Memory 420 also contains modules for carrying out the methods of the present disclosure, as will be described below. Software programs or applications that may reside in memory 420 may include personal information management applications; communications applications such as Instant Messaging (IM), presentation and email applications; messaging applications; video game applications; web browser applications; photo and picture editor applications; address applications; music applications; and the like. As will be described further below, such applications may be represented by a representative icon or image. Additional applications or programs can be loaded onto electronic device 300 through data port 460, for example.

Electronic device 300 also includes an input subsystem 430 for controlling the device, navigating through content, selecting content to playback, and the like. Input subsystem 430 may also include, for example, keys 330, 340, 350, 360, 370, and 380, described above. Input subsystem 430 may comprise a touchpad, a trackball, a roller wheel, a touch screen with or without a stylus, or any other suitable input device.

A power source 450, such as a battery, is used to power up the processor 410, memory 420, and other subsystems on electronic device 300. In some examples, power source 450 is a power supply connector, a fuel cell, a solar cell, or any other suitable power source.

Touch screen 310 of output subsystem 435 may be, for example, a liquid crystal display (LCD) coupled to processor 410 and displays electronic content as described above. Touch screen display 310 may be a light emitting diode (LED) display, a plasma display, an electronic ink display (e-ink), a Thin Film Transistor (TFT) LCD, or any other suitable display type. Operation of touch screen display 310 is controlled by display controller 475. Touch screen display 470 corresponds to touch screen 310 of FIG. 3 and is controlled by display controller 475 as shown.

Electronic device 300 also has speaker 480 for playing back audio content, the audio component of video content, or audio produced by text-to-speech of text content, and the like.

In some examples of the disclosure, short-range communications subsystem 440 is a wireless local area network (WLAN) subsystem, an Infra Red Data Association (IrDA) subsystem, or a ZIGBEE® subsystem. Other short-range communications subsystems would also be apparent to those of skill in the art.

Data port 460 is a serial port according to the RS-232 specifications, an IEEE 1394 FireWire port, an optical connection, a local area network (LAN) connection such as Ethernet, or any other suitable data communications port.

Memory 420 may be a Random Access Memory (RAM), a serial electrically erasable programmable read only memory (SEEPROM), a removable secure digital (SD) card, a removable compact flash card, a USB flash drive, or any other suitable memory module as would be apparent to those of skill in the art.

As previously described, software programs or applications, referred to herein as applications, may be executed on an electronic device have a touch screen with a viewable area. In particular, photo or picture editors may be run as part of a photo application, for example, in order for a user to select and then apply changes to a chosen image using a selected filter. In accordance with various illustrative embodiments presented herein, a filter may be dynamically applied to an image in a manner that is easily controllable by a user of a photo editor application and that allows the user to progressively see changes to the image as the filter is being applied. The use of a drag handle by a user in a user interface of a photo editor application allows the user to focus on the image as it changes during application of the filter.

Figure 5:
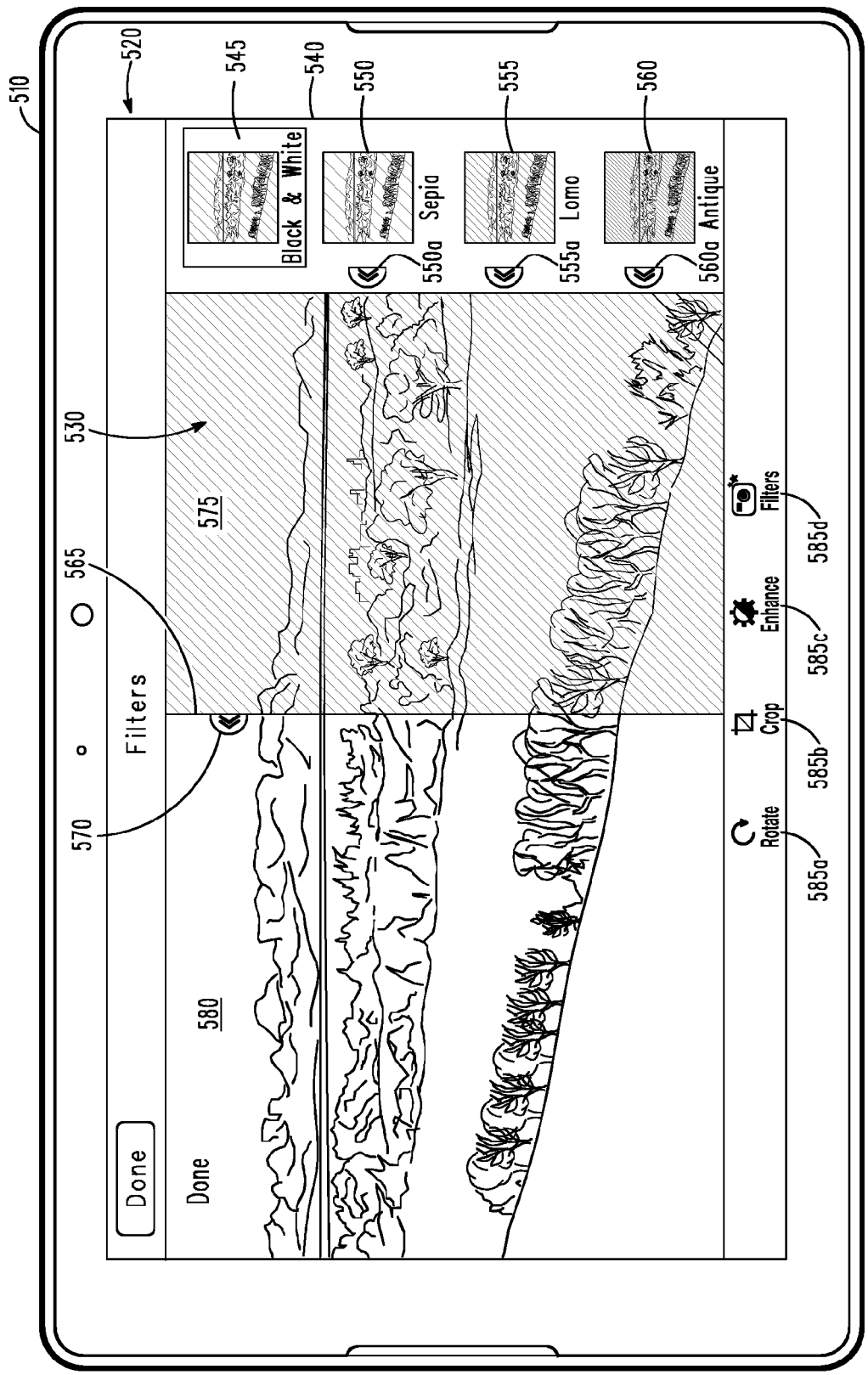
FIG. 5 illustrates a drag handle of a picture editor application for use in dynamically applying image filters, in accordance with various aspects of the present disclosure.

Referring now to FIG. 5, an illustration 500 of a user interface of a picture editor application running on an electronic device is shown. Electronic device 510 has a viewable area 520 of a touch screen in which the user interface of a picture editor application is displayed. A number of display parameters 585a, 585b, 585c, and 585d, corresponding to Rotate, Crop, Enhance, and Filters, respectively, can be changed in the picture editor application. It can be seen that the "Filters" option 585d in the picture editor application has been selected by its highlighted status, and this selection is reflected in panel 520 as shown. A number of selectable filters available for selection are displayed in a selection area 540 of the screen. In this particular example, previews 545, 550, 555, 560 corresponding to selectable filters Black & White, Sepia, Lomo, and Antique applied to image 530, respectively, are displayed in the selection area 540 of the screen. As shown here, the previews 545, 550, 555, and 560 may be thumbnail views.

The selectable filters, represented by previews 545, 550, 555, and 560, may be displayed, as shown here, in a list that is scrollable; thus, there may likely be more filters than the four filters currently displayed: Black & White, Sepia, Lomo, and Antique. The ordering of the filters in the selection area 540 may be arranged in various ways, including placing the most popular or most used filters first, alphabetically, most recent, etc.

The selected filter is this particular example is Black & White filter preview 545, which is highlighted by the placement of a highlighted box around it, as shown. The selected filter may be highlighted or indicated in other ways, such as by placing a color background behind it, outlining it in some way, etc. It is noted that the selected filter preview 545 is in fact also highlighted by the absence of its drag handle 570 from the selection area 540. The drag handle 570 associated with the selected filter 545 may be dynamically applied to image 530 in a manner that is easily controllable by control of the drag handle by the user, thereby allowing the user to progressively see changes to the image as the selected filter 545 is applied. The use of drag handle 570 by a user allows the user to focus on the image 530 and to see how it progressively changes during application of Black & White filter 545, without having to remember how the image changes in response to application of this filter.

In this particular example, the user has moved drag handle 570 over a portion 575 of image 530; the selected Black & White filter 545 has been applied has the user moved drag handle 570 over this portion 575. The selected Black & White filter 545 has only been moved over a portion of image 530 and the unfiltered portion 580 shows the image in its original "raw" form with no filtering applied. The draft handle 570 is connected to the area where the user is "dragging" the handle. So, if a user dragged out the handle, but then released the handle, the handles does not stay in that place on the screen; if the handle was beyond the threshold when released, it is applied to the entire image and if the handle was not beyond the threshold when released it is put "back" with its associated filter in the preview area, where it was originally located, without application of the associated filter to the image. This dynamic and partial application of a selected filter to a portion of a displayed image allows the user to progressively see changes to the image as the selected filter is applied and also allow the user to focus on the image as it changes. There is no need for the user to try to recollect how an image previously looked when filter was applied.

As indicated by the directional arrows of drag handle 570, the selected Black & White filter 570 has been applied to the image 530 by dragging the handle in a right-to-left horizontal motion by the user. The user can control movement of drag handle by a user finger or by use of a mouse, stylus or the like. The drag handle could also be configured to apply a selected filter in a left-to-right horizontal motion across the image, a top-to-bottom vertical motion across the image, a bottom-to-top vertical motion across the image, or even a corner-to-corner diagonal motion across the image. Of course, it is understood that rotation of the device itself may change a horizontal motion to a vertical motion across the image, and vice-versa. The partial and dynamic application of a filter in response to user manipulation of a drag handle remains unchanged.

In accordance with certain aspects, a selected filter may be applied to the entire image displayed by the electronic device when the drag handle is moved beyond a threshold line in the image that is representative of a threshold portion of the image. Where the threshold line and threshold portion of the image reside may be defined in the picture editor application and that definition may be changed by the user if desired. The threshold portion of the image may be defined as a percentage of a width dimension of the image displayed on the screen and so movement of the drag handle beyond that percentage would cause the selected filter to be applied to the entire image. For example, if the threshold portion is approximately 50% of the width of the image, movement of the drag handle beyond 50% of the width of the image will cause the selected filter to be applied to the entire image. Application of the selected filter to the rest of the image 580 once the threshold line and threshold portion of the image may be exceeded may happen quickly, in a snap application of the filter to the image, or the selected filter may be applied progressively in the direction of movement of the drag handle, in this case from right to left. If the threshold portion is approximately 75% of the width of the image, movement of the drag handle beyond 75% of the width of the image will cause the selected filter to be applied to the entire image, meaning application of the selected filter to the non-filtered, non-threshold portion of the image in a direction of movement of the drag handle.

It can thus be seen that once the drag handle has been dragged beyond a threshold line in the image, if the handle is released, then the filter is applied to the rest of the image. Alternately, if the handle is released before the threshold portion or line is passed, such as by the user removing a finger from the drag handle when using a touch screen device, removing a stylus from the drag handle, or removing a mouse from the drag handle before the threshold portion is passed, the selected filter is not applied. The image may then be displayed in an unfiltered state on the screen of the electronic device or the image may be displayed in a previously displayed, filtered state. Deselection of a selected filter may also occur in response to a tap on the preview of the selected filter in the selection are of the screen. Application of a selected filter in response to user manipulation of the drag handle thus provides a simple, intuitive way to apply filters without requiring additional user input to undo or to apply filter buttons, or to display separate "before" and "after" pictures of the image.

Alternately, a selected filter may be applied to an entire displayed image in response to a tap on the portion of the image to which the selected filter has been applied; in this example, in response to a tap on portion 575. When the screen is a touch responsive screen, for example, a tap by the user on portion 575 may cause the selected filter to be applied to the entire image.

It is further envisioned that changing a display parameter of a displayed image will cause a corresponding change to the displayed filter previews 545, 550, 555, 560. Thus, rotating a displayed image on the screen of the electronic device will cause the displayed filter previews 545, 550, 555, 560 to also be rotated.

Non-selected filters 550, 555, 560 are each available for selected and each have an associated drag handle 550a, 555a, 560a as shown. If a user wishes to apply a filter that is not currently selected, the user selects the desired filter and can then move the drag handle associated with the selected filter across the displayed image. Selection of another filter deselects the currently selected filter and removes the previously applied filter. The previously selected and applied filter may seem to disappear from the image to not convey simultaneously the application of multiple filters.

In certain circumstances, some filters may be inactivated for selection in the selection area of the display screen and thus not be selectable by the user. Such would be the case, for example, for a selectable filter that depends on face recognition when it is determined that the image does not contain any face(s).

Figure 6:
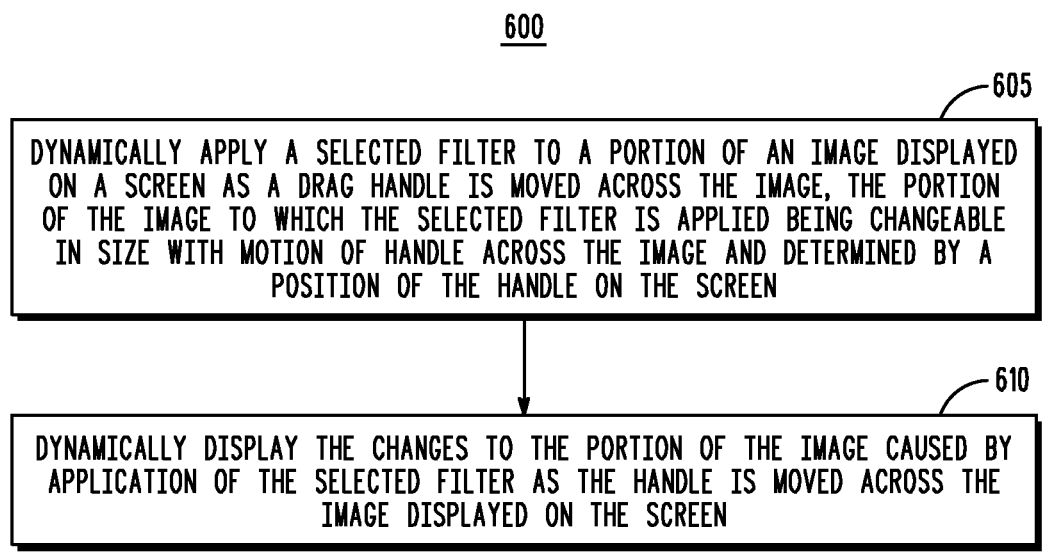
FIG. 6 is a flowchart that illustrates a method for dynamically applying image filters, in accordance with various aspects of the present disclosure.
Figure 7A:
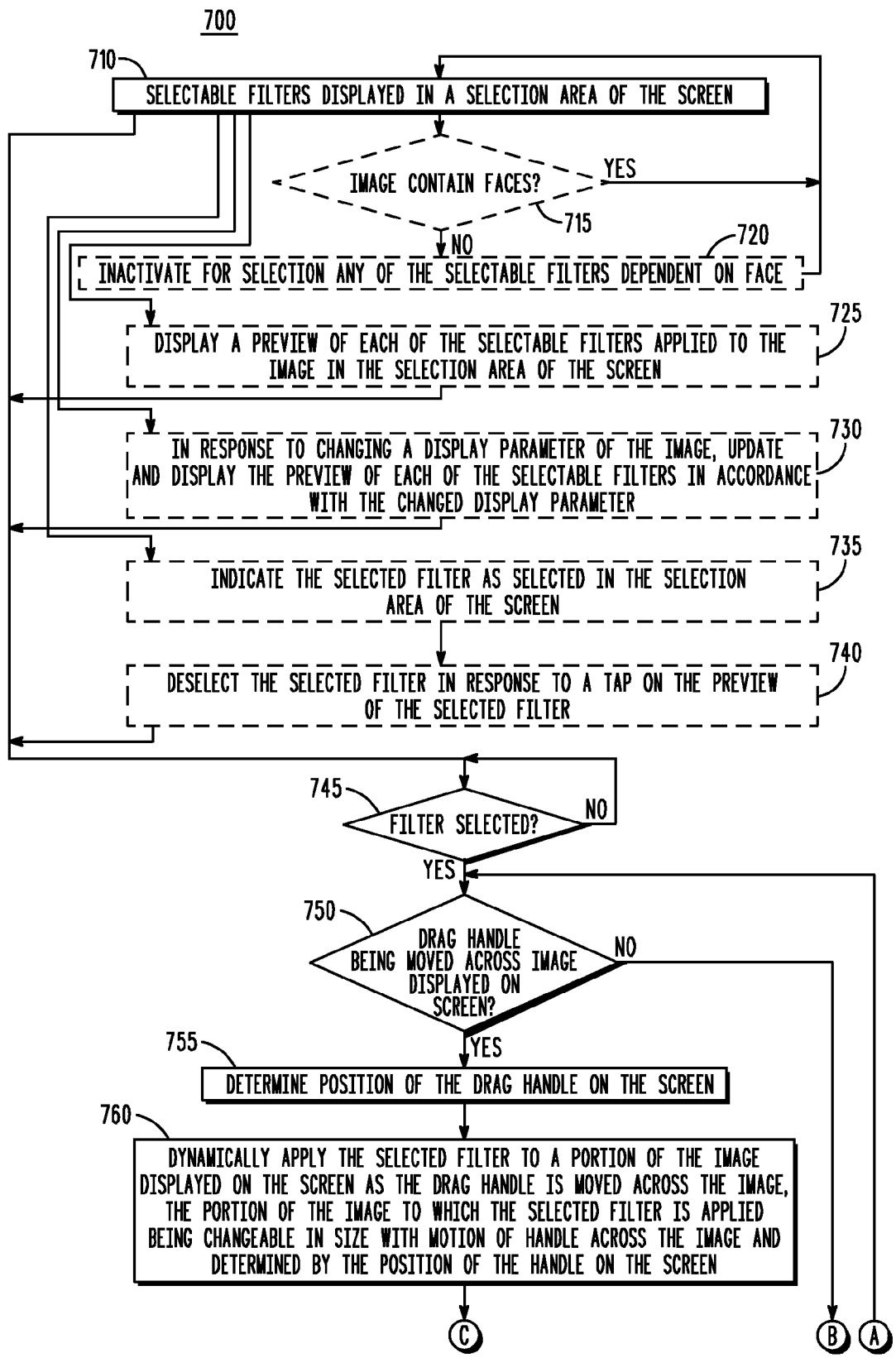
FIGS. 7a and 7b are a flowchart that illustrates a method for dynamically applying image filters, in accordance with various additional aspects of the present disclosure.
Figure 7B:
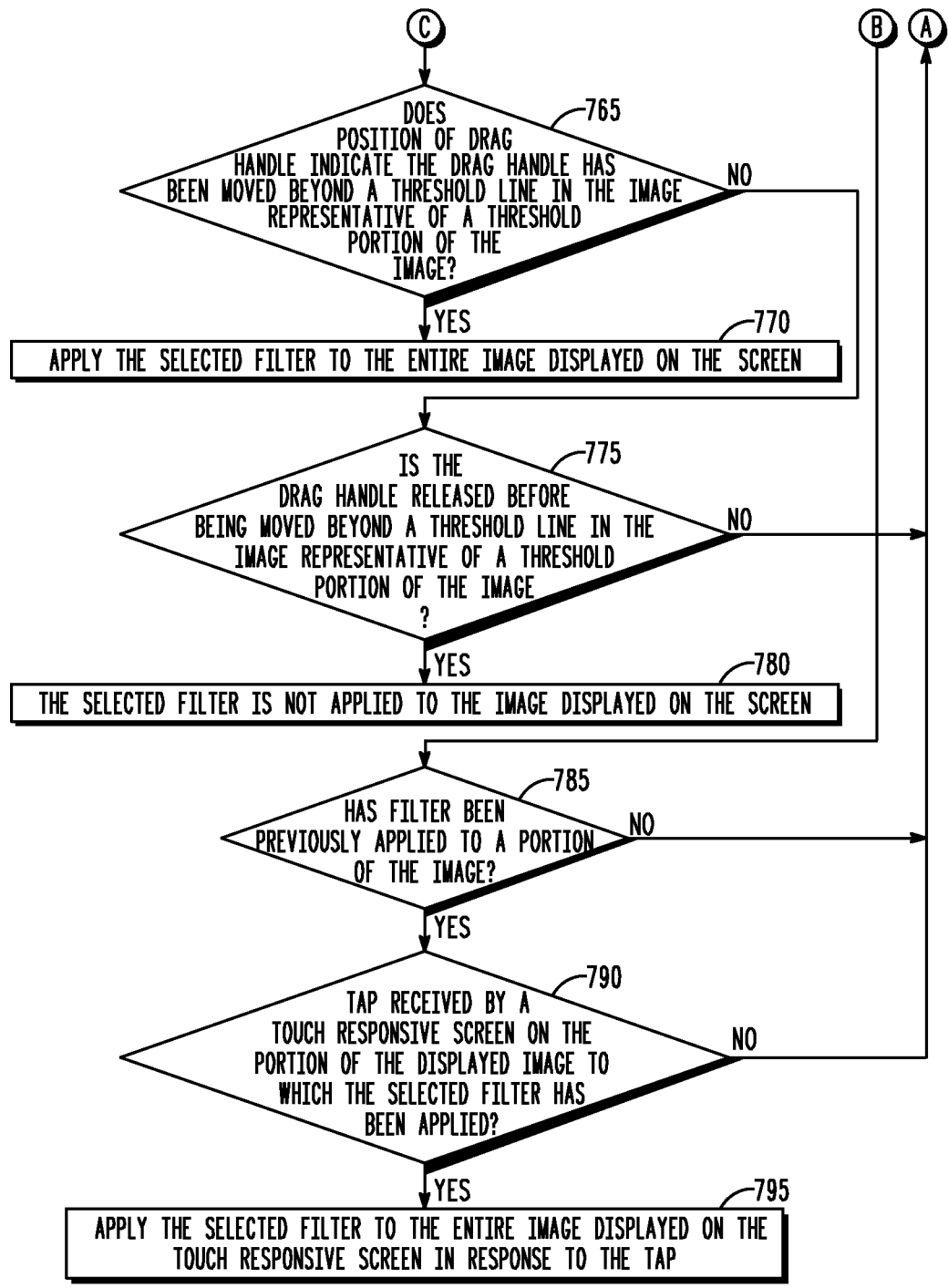

It can be seen that application of a selected filter in response to user manipulation of the drag handle thus provides a simple, intuitive way to apply filters without requiring additional user input to undo or to apply filter buttons, or to display separate "before" and "after" pictures of the image. Referring now to FIG. 6, flowchart 600 illustrates dynamically applying image filters. In Block 605, a selected filter is dynamically applied to a portion of an image displayed on a screen as the drag handle is moved across the image. As discussed, the portion of the image to which the selected filter is applied is changeable in size with motion of the drag handle across the image and is determined by a position of the drag handle on the screen. At Block 610, changes to the image caused by application of the selected filter are dynamically displayed as the drag handle is moved across the displayed image. As will be appreciated from reference to flowchart 700 of FIG. 7, these operations may involve many considerations.

At Block 710, selectable filters are displayed in a selection area of the screen and flow continues to Block 745. If a filter is selected by the user, the flow continues to Decision Block 750, where the inquiry is whether the drag handle is being moved across the displayed image. If yes, then the position of the drag handle on the screen is determined at Block 755. The selected filter is then dynamically applied to the displayed image as the drag handle is moved across the image at Block 760. The determined position of the drag handle is compared to a threshold line to determine whether the drag handle has been moved beyond a threshold line or threshold portion of the image at Decision Block 765. If yes, then the selected filter may be applied to the entire image displayed, such as by dynamically applying it to a portion of the image not previously filtered with the selected filter.

If the drag handle has not moved beyond the threshold, the flow continues from Decision Block 765 to Decision Block 775. The inquiry here is whether the drag handle is released before being moved across the threshold. If yes, then the selected filter is not applied to the displayed image after the drag handle is released. Otherwise, the flow returns to Decision Block 750.

Referring back to Decision Block 750, if the drag handle is not being moved across the image, then the inquiry at Decision Block 785 is whether the filter has been previously applied to a portion of the image. If yes, then at Block 790 the inquiry is whether a tap has been received by a touch responsive screen on the portion of the image to which the selected filter has been previously applied. If yes, then at Block 795 the selected filter is applied to the entire image in response to the tap. If no, the flow returns to Decision Block 750.

Following display of selectable filters so that they can be selected by a user at Block 710, there are a number of optional actions that may be undertaken and have been described above. These optional actions are indicated by dashed lines. The inquiry at Decision Block 715 is whether the displayed image contains faces. If no, then selectable filters that use face recognition as part of the filtering may inactivated at Block 720. Alternately, Block from Block 710 may go to Block 725 where a preview of each the selectable filters are displayed. In FIG. 5 these previews where thumbnail previews 545, 550, 555, and 560, for instance. Or, the flow may continue to Block 730, where, in response to a display parameter of the image changing, the preview of each of the selectable filters are updated and displayed in accordance with the changed display parameter. Further, the selected filter may be highlighted or otherwise indicated as being selected in the selection area of the screen, at Block 735. The selected filter may be deselected in response to a tap on the displayed preview of the selected filter at Block 740.

The order in which the optional operations represented in Blocks 715-740 occurs is not predetermined or predefined, and these operations may occur in any order or not at all after occurrence of the operation of Block 710. Thus, while the blocks comprising the methods are shown as occurring in a particular order, it will be appreciated by those skilled in the art that many of the blocks are interchangeable and can occur in different orders than that shown without materially affecting the end results of the methods.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method of dynamically applying image effect filters on an electronic device, comprising:

dynamically applying a selected image effect filter of a plurality of selectable image effect filters to a portion of an image rendered on a screen as a drag handle also rendered on the screen is moved across the image to dynamically change the size of the filtered portion of the image with respect to the size of an unfiltered portion of the image, the portion of the image to which the selected image effect filter is applied being dynamically changeable in size relative to the unfiltered portion with motion of the drag handle across the image and determined by a position of the handle on the screen;

dynamically displaying the changes to the portion of the image caused by application of the selected image effect filter as the handle is moved across the image rendered on the screen;

selecting another image effect filter of the plurality of selectable image effect filters; and in response to selecting the another image effect filter, deselecting the previously selected image effect filter and removing application of the previously selected image effect filter to the rendered image.

2. The method of claim 1, where each of the selectable image effect filters of the plurality of selectable image effect filters has an associated drag handle and further in response to selecting another image effect filter of the plurality of selectable image effect filters, displaying the associated drag handle of the selected another image effect filter.

3. A method of dynamically applying image effect filters on an electronic device, comprising:

dynamically applying a selected image effect filter of a plurality of selectable image effect filters to a portion of an image rendered on a screen as a drag handle also rendered on the screen is moved across the image to dynamically change the size of the filtered portion of the image with respect to the size of an unfiltered portion of the image, the portion of the image to which the selected image effect filter is applied being dynamically changeable in size with motion of the drag handle across the image and determined by a position of the handle on the screen;

dynamically displaying the changes to the portion of the image caused by application of the selected image effect filter as the handle is moved across the image rendered on the screen; and in response to a tap on the portion of the image to which the selected image effect filter is applied, applying the selected image effect filter to the entire image rendered on the screen.

4. A method of dynamically applying image effect filters on an electronic device, comprising:

dynamically applying a selected image effect filter of a plurality of selectable image effect filters to a portion of an image rendered on a screen as a drag handle also rendered on the screen is moved across the image to dynamically change the size of the filtered portion of the image with respect to the size of an unfiltered portion of the image, the portion of the image to which the selected image effect filter is applied being dynamically changeable in size with motion of the drag handle across the image and determined by a position of the handle on the screen;

applying the selected image effect filter to the entire image rendered on the screen in response to the handle being moved and released beyond a threshold line in the image representative of a threshold portion of the image, the threshold line being user definable; and dynamically displaying the changes to the portion of the image caused by application of the selected image effect filter as the handle is moved across the image rendered on the screen.

5. The method of claim 4, where the threshold line is predefined in a picture editor application and is user definable in the picture editor application.

6. The method of claim 4, where the threshold portion of the image is a defined percentage of a width dimension of the image rendered on the screen and is one of approximately 50% of the width of the image and approximately 75% of the width of the image.

7. The method of claim 4, further comprising in response to the handle being moved beyond the threshold line in the image dynamically applying the selected image effect filter to the entire image in a snap application of the selected image effect filter to the entire image.

8. The method of claim 7, further comprising in response to the handle being moved beyond the threshold line in the image dynamically applying the selected image effect filter to a non-threshold portion of the image to which the selected image effect filter has not been applied.

9. The method of claim 4, further comprising applying the selected image effect filter to the entire image rendered on the screen in response to the handle being moved beyond the threshold line in the image representative of the handle being moved beyond a threshold portion of the image even when the handle is released after being moved beyond the threshold line in the image.

10. A method of dynamically applying image effect filters on an electronic device, comprising:

dynamically applying a selected image effect filter of a plurality of selectable image effect filters to a portion of an image rendered on a screen as a drag handle also rendered on the screen is moved across the image to dynamically change the size of the filtered portion of the image with respect to the size of an unfiltered portion of the image, the portion of the image to which the selected image effect filter is applied being dynamically changeable in size with motion of the drag handle across the image and determined by a position of the handle on the screen;

displaying for selection the plurality of selectable image effect filters in a selection area of the screen;

indicating the selected image effect filter of the plurality of selectable image effect filters as selected in the selection area of the screen by highlighting the selected image effect filter in the selection area by one or more of placement of a highlighted box around the selected image effect filter and a color background behind the selected image effect filter; and displaying the changes to the portion of the image caused by application of the selected image effect filter as the handle is moved across the image rendered on the screen.

11. The method of claim 10, further comprising:

displaying for selection the plurality of selectable image effect filters in a selectable listing of selectable image effect filters, the selectable listing being scrollable in the selection area of the screen.

12. The method of claim 1, wherein the drag handle is coupled to a first boundary of one or more boundaries of the image and to a second boundary of the one or more boundaries of the image.

13. The method of claim 1, wherein a boundary of the filtered portion extends from a first boundary of one or more boundaries of the image to a second boundary of the one or more boundaries of the image.

14. The method of claim 3, wherein the drag handle is coupled to a first boundary of one or more boundaries of the image and to a second boundary of the one or more boundaries of the image.

15. The method of claim 3, wherein a boundary of the filtered portion extends from a first boundary of one or more boundaries of the image to a second boundary of the one or more boundaries of the image.

16. The method of claim 4, wherein the drag handle is coupled to a first boundary of one or more boundaries of the image and to a second boundary of the one or more boundaries of the image.

17. The method of claim 4, wherein a boundary of the filtered portion extends from a first boundary of one or more boundaries of the image to a second boundary of the one or more boundaries of the image.

18. The method of claim 10, wherein the drag handle is coupled to a first boundary of one or more boundaries of the image and to a second boundary of the one or more boundaries of the image.

19. The method of claim 10, wherein a boundary of the filtered portion extends from a first boundary of one or more boundaries of the image to a second boundary of the one or more boundaries of the image.

* * * * *